US007047114B1

(12) United States Patent
Rogers

(10) Patent No.: US 7,047,114 B1
(45) Date of Patent: May 16, 2006

(54) SYSTEM AND APPARATUS FOR AUTOMATIC AND CONTINUOUS MONITORING, PROACTIVE WARNING AND CONTROL OF ONE OR MORE INDEPENDENTLY OPERATED VESSELS

(76) Inventor: Charles David Rogers, 2830 Chablis Dr., Erie, PA (US) 16506

( * ) Notice: Subject to any disclaimer, the term of this patent is extended or adjusted under 35 U.S.C. 154(b) by 253 days.

(21) Appl. No.: 10/692,202

(22) Filed: Oct. 23, 2003

(51) Int. Cl.
*B60L 15/00* (2006.01)
*B60L 3/00* (2006.01)

(52) U.S. Cl. .................. 701/21; 701/1; 701/2; 701/23; 701/29; 701/36; 340/438; 340/439

(58) Field of Classification Search ................ 701/1–2, 701/21, 23–24, 29–36, 200, 207–208, 213; 340/988–989, 438–439, 459–462, 425.1, 340/426.1, 426.11, 426.12, 426.13, 500, 531, 340/539.1; 348/143, 148
See application file for complete search history.

(56) References Cited

U.S. PATENT DOCUMENTS

| | | | | |
|---|---|---|---|---|
| 6,133,867 | A | 10/2000 | Eberwine | 342/29 |
| 6,249,241 | B1 | 6/2001 | Jordan | 349/41 |
| 6,469,641 | B1 * | 10/2002 | Lash et al. | 340/984 |
| 6,487,983 | B1 * | 12/2002 | Jonsson et al. | 114/144 R |
| 6,591,094 | B1 | 7/2003 | Bentley | 455/405 |
| 6,611,737 | B1 * | 8/2003 | El-Tahan et al. | 701/21 |
| 6,658,349 | B1 * | 12/2003 | Cline | 701/207 |
| 6,816,088 | B1 * | 11/2004 | Knoska et al. | 340/984 |
| 6,904,341 | B1 * | 6/2005 | Kish et al. | 701/21 |
| 2002/0158776 | A1 | 10/2002 | Lash | 340/984 |
| 2002/0169527 | A1 | 11/2002 | Cline | 701/21 |

(Continued)

OTHER PUBLICATIONS

Jo Posti, New Boat Security and Remote Monitoring System, Motorola Press release, Dec. 14, 2000, Motorola, Boynton Beach, FL.

(Continued)

*Primary Examiner*—Gertrude A. Jeanglaude

(57) ABSTRACT

A modular computer and telecommunications system for automatic continuous real-time monitoring, tracking, navigation and proactive warning for one or more private and commercial marine vessels and for automatically controlling their navigation within a specific region. The disclosed system and apparatus employs intelligent display, GPS, and transceiver/modem devices on marine vessels that are underway, anchored or docked to routinely transmit the vessels ID, GPS and status data to a supervisory fail-safe computer server. The server's resident relational database contains both pre-entered static information about all vessels having similar on-board devices, as well as dynamic information (such as coordinate data relating to rough seas, severe weather, GPS data for all participating vessels, underwater hazards, fog, etc.). Applications software in the fail-safe server conducts an 'around-the-clock' continuous and automatic real-time comparison of the received vessel parameters with the static and dynamic information stored its relational database. Should the comparison and control algorithm detect any threatening or off-normal situations, such as approaching participating vessels in fog/darkness, severe weather, etc. the server transmits an outgoing packet of information containing a proactive warning via digital wireless to the appropriate participating vessels' GPS Display/transceiver/modem devices. The software within each device will enable appropriate audible message displays and/or graphic image warnings for participating vessels in the region, as well as provide waypoints/magnetic compass headings for autopilots. The system fail-safe server also automatically responds to a keypad integral with the device for Maydays and operator non-emergency queries, such as the ID, speed, direction, of nearby vessels, weather, etc.

13 Claims, 11 Drawing Sheets

U.S. PATENT DOCUMENTS

| | | | | |
|---|---|---|---|---|
| 2004/0111195 | A1 * | 6/2004 | Vries et al. | 701/21 |
| 2004/0193367 | A1 * | 9/2004 | Cline | 701/207 |
| 2004/0217900 | A1 * | 11/2004 | Martin et al. | 342/357.07 |
| 2004/0243859 | A1 * | 12/2004 | Mueller et al. | 713/300 |

OTHER PUBLICATIONS

RF Neulink, Wireless Data Solutions, RF Industries, RFI Website Nov. 11, 2003, New Product Release, San Diego, CA.

Raytheon Marine, Automatic Identification System (AIS), Product Description, Raytheon GmbH, Kiel Germany.

Elaine Dickinson, Rescue 21 Mapped Out, BoatUS Magazine, Jan. 2002, p. 22, Boat Owners Association of USA, Alexandria, VA.

John Rousmaniere, The Annapolis Book of Seamanship, Chapter4-Weather pp. 103-132, Part III—Navigation Chapters 9-13, Simon & Schuster, NY, NY 1989.

Dick Thompson, Port Security Needs You, Boat US Magazine, Sep. 2003, p. 32, Boat Owners Association of USA, Alexandria, VA.

* cited by examiner

| | | | | |
|---|---|---|---|---|
| | | | | |
| | | | | |
| | Mariner Keypad or On-b ard S nsor Initiated Transmissi ns | | | |
| | | | | |
| | Em rgency K y (E) with example cod s for typ of emergency. | | | |
| | | Transmissions alternatively initiated automatically by | | |
| | | sensors noted with "*" | | |
| | Code | | Condition | |
| | | | | |
| | 1 | | Man Overboard | |
| | 2 | | Engine fire* | |
| | 3 | | Explosion or Collision* | |
| | 4 | | Heart failure | |
| | 5 | | Excessive Bleeding | |
| | 6 | | Unconscious Passenger | |
| | 7 | | Taking on water - high rate* | |
| | 8 | | Concussion | |
| | 9 | | Other serious injury | |
| | 0 | | Vessel at site of emergency | |
| | A | | Smoke - black* | |
| | B | | Smoke - blue* | |
| | C | | Smoke - gray* | |
| | D | | Lost night lights* | |
| | * | | Excessive Throttle Position | |
| | E | | Suspicious vessel nearby | |
| | | | | |
| | Service Request Key (S) with example codes for type of service. | | | |
| | | | | |
| | Code | | Condition | |
| | | | | |
| | 1 | | Engine stall - need mech or tow | |
| | 2 | | Out of fuel - gasoline | |
| | 3 | | Out of fuel - diesel | |
| | 4 | | Run aground - tow | |
| | 5 | | Main battery discharged | |

*Fig. 3*

Mariner Initiated Alphanumeric Keypad Entries

Navigation Information Key (N) with example codes for operation.

| Code | Condition |
|---|---|
| 1 | Waypoint modification |
| | Float plan (No. and expected t) |
| 2 | Add new waypoint(s) |
| | Float plan (No. and expected t) |
| 3 | Anchored postion |
| | Coord. & expected time |
| 4 | Weigh anchor |
| | Coord. & time |
| 5 | Provide safe course waypoints |
| | Enter target waypoint |

Mariner Database Query Key (D) with example codes for operation.

| Code | Condition |
|---|---|
| 1 | List nearby vessels |
| | *Miles radius, ID, type, captain* |
| 2 | List nearby on-shore Navaids |
| | *Coord - type of signals* |
| 3 | List nearby off-shore Navaids |
| | *Coord - type of signals* |
| 4 | List nearby landmarks |
| | *Miles rad type, signals day/night* |
| 5 | List nearby underwater hazards |
| | *Miles rad. Coordin type* |
| 6 | Provide a transmit check |
| 7 | Provide a depth check |

*Fig. 4*

| | | | | |
|---|---|---|---|---|
| | | | | |
| | Per Vessel Table of Static Records in Relational Data Base | | | |
| Vessel ID No. | | | | |
| Owner | Boat Type | Boat Color | Boat Trim | Boat Name |
| Registration No. | Length | Make | Xtra Field | Xtra Field |
| Owner | Name | Address | Phone | Email |
| Coowner #2 | Name | Address | Phone | Email |
| Coowner #2 | Name | Address | Phone | Email |
| Engine Type | No. of Engines | HP each | Fuel Capacity | Fuel Type |
| Survival Equip | PFDs | Flares | Mirror | Dinghy/raft |
| Smoke signals | Flash/spotlight | Food | Anchor | EPIRB |
| Radio | Type | # of Freqs. | Radar | Other |
| Xtra Field | Xtra Field | Xtra Field | Xtra Field | Xtra Field |
| Xtra Field | Xtra Field | Xtra Field | Xtra Field | Xtra Field |
| Float Plan No. | Persons Aboard | | | |
| Pssngr name | Address | Phone no. | Age | Emerg. Contact |
| Pssngr name | Address | Phone no. | Age | Emerg. Contact |
| Pssngr name | Address | Phone no. | Age | Emerg. Contact |
| Pssngr name | Address | Phone no. | Age | Emerg. Contact |
| Pssngr name | Address | Phone no. | Age | Emerg. Contact |
| Pssngr name | Address | Phone no. | Age | Emerg. Contact |
| Pssngr name | Address | Phone no. | Age | Emerg. Contact |
| | | | | |
| Time Leave at | FROM | GOING TO | EXPECT RTN BY | |
| Time at Stop 1 | Where | Going to | Expect Depart T | |
| Time at Stop 2 | Where | Going to | Expect Depart T | |
| Time at Stop 3 | Where | Going to | Expect Depart T | |
| | | | | |
| WAYPOINTS FOR TRIP | | | | |
| 1 | N deg min | W deg min | Date/Mil. Time | X% Course Toler. |
| 2 | N deg min | W deg min | Date/Mil. Time | X% Course Toler. |
| 3 | N deg min | W deg min | Date/Mil. Time | X% Course Toler. |
| 4 | N deg min | W deg min | Date/Mil. Time | X% Course Toler. |
| 5 | N deg min | W deg min | Date/Mil. Time | X% Course Toler. |
| 6 | N deg min | W deg min | Date/Mil. Time | X% Course Toler. |
| 7 | N deg min | W deg min | Date/Mil. Time | X% Course Toler. |
| | | | | |
| | | | | |

*Fig. 7*

| | | | | | | |
|---|---|---|---|---|---|---|
| | Table of Dynamic Records in Relational Data Base | | | | | |
| Vessel ID No. | Captain | N dms | W dms | Heading | Spd -knots | |
| Vessel ID No. | Captain | N dms | W dms | Heading | Spd -knots | |
| Vessel ID No. | Captain | N dms | W dms | Heading | Spd -knots | |
| Vessel ID No. | Captain | N dms | W dms | Heading | Spd -knots | |
| Vessel ID No. | Captain | N dms | W dms | Heading | Spd -knots | |
| Vessel ID No. | Captain | N dms | W dms | Heading | Spd -knots | |
| Vessel ID No. | Captain | N dms | W dms | Heading | Spd -knots | |
| Vessel ID No. | Captain | N dms | W dms | Heading | Spd -knots | |
| Vessel ID No. | Captain | N dms | W dms | Heading | Spd -knots | |
| Vessel ID No. | Captain | N dms | W dms | Heading | Spd -knots | |
| Vessel ID No. | Captain | N dms | W dms | Heading | Spd -knots | |
| Vessel ID No. | Captain | N dms | W dms | Heading | Spd -knots | |
| Vessel ID No. | Captain | N dms | W dms | Heading | Spd -knots | |
| | | dms = degrees/minutes/seconds | | | | |
| | Front End Point 1 | | Front End Point 2 | | | |
| STORM 1 | N dms | W dms | N dms | W dms | Heading | Spd -knots |
| STORM 2 | N dms | W dms | N dms | W dms | Heading | Spd -knots |
| STORM 3 | N dms | W dms | N dms | W dms | Heading | Spd -knots |
| FOG 1 | N dms | W dms | N dms | W dms | Heading | Spd -knots |
| FOG 2 | N dms | W dms | N dms | W dms | Heading | Spd -knots |
| FOG 3 | N dms | W dms | N dms | W dms | Heading | Spd -knots |
| WATERSPOUT 1 | N dms | W dms | N dms | W dms | Heading | Spd -knots |
| | Front End Point 1 | | Front End Point 2 | | | |
| 4 TO 10 WAVES | N dms | W dms | N dms | W dms | | |
| AREA | Rear End Point 3 | | Front End Point 4 | | | |
| | N dms | W dms | N dms | W dms | | |
| | | dms = degrees/minutes/seconds | | | | |

*Fig. 8*

| Threat List vs. Setpoint and Origin | | |
|---|---|---|
| | | |
| | | |
| | | |
| **Function** | **Origin** | **Setpoint** |
| | | |
| Tracking | GPS (subject vessel) | |
| Radar Equivalent | GPS (vessels near subject vessel) | |
| | | |
| **Threat** | **Origin** | **Setpoint** |
| | | |
| Off Course - Float Plan | Float Plan - Manual Entry | Waypoint (no.,time) envelope |
| Collision | GPS data (threatenting vessel) | GPS data (threatening vessel) |
| Restricted Area | GPS data (perimeter endpoints) | Waypoint envelope |
| USN Ship Restriction | GPS data (USN Ship) | Dynamic Waypoint Envelope |
| Severe Storm | NOAA- time-lapse Doppler (Intemet) | Storm front width, heading and speed |
| High Waves/Wind | NOAA buoys/Internet | Waypoint Defined Area |
| High Wind | NOAA time-lapse Climatic map (Intemet) | Waypoint Defined Area |
| Underwater Obstruction | Charts & Manual Region Update | Waypoint Perimeter |
| Surface Obstruction | Charts & Manual Region Update | Waypoint Perimeter |
| Fog | Manual signting (etc.) | Waypoint Perimeter |
| | | |
| | | |
| | | |
| | | |
| | | |
| | | |

*Fig. 10*

SYSTEM AND APPARATUS FOR AUTOMATIC AND CONTINUOUS MONITORING, PROACTIVE WARNING AND CONTROL OF ONE OR MORE INDEPENDENTLY OPERATED VESSELS

CROSS-REFERENCE TO RELATED APPLICATIONS

Not applicable.

FIELD OF THE INVENTION

This invention relates to monitoring, proactive warning, control, navigation and safety of an undetermined number of independently operated vessels that exist within a defined space, in a preferred embodiment, the invention relates to the monitoring, proactive warning, control, navigation and safety of marine vessels in a harbor or off-shore on a coastline.

BACKGROUND

Global Positioning Systems (GPSs) are commonly used by marine vessel operators in order to continuously monitor the variables associated with safe navigation including coordinates, speed, heading, time and others. Although the GPS system is accurate and provides vital data relating to position in time of emergency, the GPS does not automatically provide information relating to approaching hazards such as storms, underwater hazards, potential collision with another vessel and many other conditions related to safe and accurate navigation. In order to obtain this information in real-time and automatically, a marine vessel must be equipped with a complete collection of integrated add-on navigation equipment including radar, graphic imaging capability for displaying charts and navigation aids, Doppler weather display and be alerted to changing underwater and above water hazard locations.

Implementation and application of the additional equipment necessary to achieve the ultimate in navigation is very expensive, must be attended, requires continual updating and maintenance, is difficult to interface in order to consolidate information and many other disadvantages. For example, anytime a vessel operator wants to view a Doppler weather image; the operator must have an Internet connection to a laptop computer or a special FAX machine. Or at anytime an operator needs to view nearby vessel traffic in fog; the operator must have an expensive radar system. It is virtually impractical for the average small commercial or pleasure vessel operators to equip their watercraft with a total complement of navigation equipment in order to provide real-time, safe and secure vessel navigation.

With regard to response to distress calls at sea (Maydays), the current system being implemented, that applies GPS readings, is a system that requires a new model of a VHF marine radio. The system, Digital Selective Calling (DSC) requires that an operator of a vessel in distress initiate a key on the vessel's marine radio. The radio will then emit a Mayday call on Channel 70 and at the same time transmit the GPS position (provided the GPS is connected). There are response delays associated with the system and the US Coast Guard will not be in a position to monitor the Mayday until it has the proper equipment in a few years. In the meantime, response to the Mayday is dependent on other vessels monitoring Channel 70 and relaying the Mayday to the US Coast Guard. As in the past, this will initiate time-consuming verbal question and answer by the US Coast Guard in order to determine the nature of the emergency.

In prior art an automated user notification system predates the instant invention; however, that system features are focused on warning the user in the sense that it only monitors threat-related information (user items) about a particular vessel, vehicle or other means of conveyance. The automated user notification system does not monitor threat-related information about the vessel, vehicle or other means of conveyance's external environment. When applied to a marine vessel as an example, should the automated user notification system system detect intrusion or attempted burglary via the on-board alarm system, a Network Operations Center (NOC) automatically provides immediate notification to the vessel owner if such a condition exists. In its complete embodiment, the automated user notification system system is limited to providing the owner with capability to automatically receive data from the vehicle concerning the cause of alarm actuation and to determine vessel location and status of vessel-associated parameters only. This is a serious drawback because the automated user notification system cannot proactively warn for external threats (collisions with other similarly equipped vessels, collisions with above water and underwater obstructions, etc.) and/or environmental threats (severe storms, fog, high waves and winds, etc.) to the user himself as well as the user's vessel. Nor does the automated user notification system have the ability to exert full dynamic control of navigational guidance for the vessel from a remote location in the case of a disoriented or disabled mariner, for example. Further disadvantages will be apparent to those skilled in the art and familiar with existing technology.

A second example of prior art is the application of the features associated with a Marine Vessel Traffic System (VTS) for harbors. The VTS collects harbor traffic information from multiple remote sensor collection sights around a harbor. The collected information is integrated, merged and stored in a remote and attended on-shore server computer. This computer is equipped with sophisticated processing software, an ORACLE database and an operator console for display and monitoring of marine vessel information and images. The presentation type and the display selection, from the plurality of operator displays, is determined automatically by means of the server computer software. The VTS utilizes pre-Global Positioning System (GPS) technology in order to monitor maritime shipping and US Navy vessels in all stages of harbor navigation and docking. The principle remote sensors used include real-time closed circuit television and radar. All information is collected from these remote sensors and are either stored or displayed via the attended shore-based server computer, also termed the Vessel Traffic Control Subsystem (VTCS). The VTCS demonstrates the prior state-of-the-art in marine vessel manual monitoring by using sophisticated computer-based data acquisition, database and monitoring technology. By comparison with the current system of the instant invention, the VTS system is considerably limited because of the absence of continuous on-vessel GPS monitoring and of closed-loop automatic proactive warning and control for impending threats to navigation and on-board vessel conditions.

A third in prior art, are systems for maritime marine vessel tracking. The features in this class of system are representative of many currently available satellite-based maritime shipping tracking and reporting systems. The system for marine vessel tracking uses a Remote Tracking Center (RTC) that receives GPS information from large marine shipping vessels, such as underway container ships, and stores this information at the RTC. One primary purpose of the system for marine vessel tracking is to generate third party reports. The RTC can transmit a signal to the subject vessel to trigger a report; however, by comparison with the current system of the instant invention, the RTC system is considerably limited because of the absence of closed-loop, automatic and proactive warning and control for impending threats.

A fourth in the prior art are collision avoidance system that features include a satellite navigational system to determine object motion parameters relative to the earth's surface and exchanges this information with other objects. In a collision avoidance system, each aircraft, vessel or other means of conveyance involved contains an on-board dedicated master computer processing unit (CPU) to carry-out a single function. The CPU receives tagged GPS information from transceivers positioned in other aircraft, vessels or other means of conveyance. The CPU also receives information from transmitters positioned on stationary obstructions such as mountains and radio towers. The on-board CPU software then applies this incoming information in order to compute the potential of collisions in three-dimensional space. As part of this function and if necessary, the CPU will provide a warning to the pilot or operator and/or send a signal to divert the aircraft from the collision path. The system for collision avoidance in aircraft is of necessity limited in its purpose by comparison to the instant invention. Specifically, system for collision avoidance does not provide closed-loop control, automatic and proactive warning and control for a complete family comprising collision avoidance and many other threats to vessels including those associated with storms, fog, manually programmed navigation restrictions and others.

The dedicated CPU of the system for collision avoidance that is applied on-board in high speed aircraft must of necessity be single function because of the limited processing time window and stringent FAA requirements for hardware and software reliability, as well as, software maintainability. Because of the lower speeds of marine vessels by comparison with aircraft, the system of the instant invention applies a relatively simple user-friendly operator interface in each marine vessel as an on-board proactive warning and control device. In the instant invention, all calculations and analyses that are used to determine threats to vessels are resident on a single fail-safe server computer that will normally be unattended and installed on-shore and communicate via digital wireless with the vessel on-board devices. The fail-safe server computer of the instant invention comprises sufficient processing capacity, memory and peripherals to conduct many functions for proactive emergency warning and control for a large number of marine vessels within a large coastal or inland water region. Proactive warning and control for navigation errors, severe weather, surface and underwater obstructions and collision avoidance with other vessels are but a few of the functions that will comprise the implementation of the system of the instant invention.

In summary, an unattended, but optionally attended, system for automatic 24/7 preventative warning and proactive initiation of Emergency Services alerts is not currently available in order to provide operators of one or more specific vessels of dangerous navigation threats that may lead to loss of life and property.

SUMMARY OF THE INVENTION

The present invention is designed principally for use to cover a large manageable region of coastal waters normally within an area in reach of the typical marine vessel towing company (typically between 500 and 2000 sq. miles). The reason for this fundamental restriction is to insure that the information contained within the dynamic part of the relational database in the system fail safe server is kept current with navigational changes within the specific region where the system is applied. For example, charts available from various agencies that show depth, underwater obstructions, etc. do not reflect real-time changes due to shifting sands, low regional water level, new dredging, thick seaweed growth, etc. However, Regional US Coast Guard, towing services, marina owners, boaters in the region and other personnel frequently have first-hand knowledge of this information, as well as its location. The dynamic part of the relational database in the system fail-safe computer server permits these real-time changes to be added as waypoints and/or restricted areas. Thereby, this capability in the system server software will redirect vessel navigation in order to avoid these impediments. Existing systems for marine vessel navigation do not conduct this important function that is vitally needed for boater safety. Importantly, the system of this invention answers this need for safe regional management of waters.

In accordance with the present invention, a modular computer enterprise for automatic 24/7[1] polling-for and monitoring digital wireless communication signals sent from a plurality of intelligent display, GPS, transceiver/modem devices (heretofore termed 'special purpose devices') installed on marine vessels located within a large defined region is disclosed. These vessels may either be underway, anchored or docked. The signals are received and analyzed by novel computational algorithms resident in an unattended fail-safe computer server. On the basis of the outcome of these analyses, the server computer may automatically transmit, proactively, wireless signals to one or a plurality of the special purpose devices installed on participating marine vessels. (A participating marine vessel is herein defined as a vessel that also has an active on-board special purpose device, as will be later described in my invention.) The signals, automatically transmitted by the server to an individual or to a multiplicity of participating vessels, include proactive warnings such as for impending vessel collisions with other participating vessels, on-coming severe weather, underwater hazards, etc. The vessel operator may also elect that a status warning be provided for other on-vessel operating information that is outside normal operating conditions (comprises on-board fire, fuel fumes, excessive throttle position, etc.). When received by the special purpose device on vessel(s), the warnings and information will be audibly annunciated and/or displayed. The vessel operator, via an operator keyboard entry may also select software functions, resident on the server.

[1]"24/7"—Twenty-four hours and seven days per week.

One of the many inventive functions resident on the server will request that the server apply an algorithm to determine and transmit navigational waypoints and/or magnetic compass headings for a safe course between the current position of the vessel and a future position as designated by the vessel operator. The operator may optionally interface these transmitted waypoints and/or magnetic compass headings to a vessel autopilot in order to provide setpoints for automatic control of the vessel navigation system. The transmitted course waypoints and/or magnetic compass headings will include compensation for any current unsafe conditions that exist in the region of the course such as underwater obstructions, storm conditions (high winds, waves, fog), nearby participating vessels, etc. This latter feature of the invention is particularly useful should the vessel operator suddenly become incapacitated or disoriented.

In a preferred embodiment, the server software algorithm continuously and automatically tracks the participating vessel(s) within a given region via digital wireless signals and then conducts automatic analyses of the vessels' position, speed, and direction with relation to other participating vessel(s) in the region. The result of these analyses may cause the server software algorithm to initiate a transmission of data, again via digital wireless signals, to one or more of the participating vessels in the region. The vessel on-board special purpose device that includes an intelligent Display, GPS, and transceiver/modem will receive these signals. This special purpose device can be handheld or mounted to the vessel. The device will have the capability to proactively warn-for; collision with a participating vessel or an underground or known surface obstruction, significantly off-course or delayed from float plans preloaded on the server database, and/or other reasons related to vessel tracking.

As additional functional and more sophisticated embodiments within the hierarchy of those available, the fail-safe server software algorithms will include the capability to conduct analyses of the participating vessels' relative position, speed with respect to fierce storms, high winds and waves, low water and other dangerous conditions. In each case, it is key to the invention that the server will automatically initiate the transmission of proactive warnings to the appropriate participating vessel(s). Another important embodiment is the capability to respond to vessel operator's request for navigational waypoints and/or magnetic compass headings for a safe course between the current position of the vessel and a future position as designated by the vessel operator. These waypoints and/or magnetic compass headings may be interfaced to the vessel autopilot for safe automatic navigation of the vessel.

The degree of server functionality available to any given participating vessel is optional and is selected from a hierarchy by a vessel's owner or operator. However, future marine navigation regulations, government agencies and/or other governing bodies may mandate some functions.

Another embodiment of the invention also contains a 'manual intervention' or 'non-automatic' capability where a keypad integral with the vessels' special purpose devices permits operators to key-in and immediately send a high-priority digital packet to the server. The packet will contain information that indicates either an emergency (Mayday) or less severe conditions relating to the vessel. The keypad may also be used by the vessel operator for queries for information that is resident in the server's relational database.

An important feature of the preferred embodiment is that in the case of a Mayday, a coded entry, accompanying the Mayday key-in will instantaneously provide transmission of the nature of the emergency and thereby reduce or avoid loss of valuable time normally associated with establishing voice contact and queries. In a Mayday, the fail-safe server automatically, at all times of the day or night, retransmits the alert and the nature of the Mayday to the US Coast Guard of Homeland Security, to other emergency services and to either specific or all participating marine vessels in the covered region. The Emergency alert will also be interfaced in parallel with the Rescue 21 system via a VHF/DSC Marine Radio transmission.

GENERAL DESCRIPTION OF THE INVENTION

A system platform serves as the infrastructure for the most basic application of my invention. In this platform, there are two types of intelligent devices that are necessary in order to achieve the functionality of my invention: 1.) A fail-safe digital computer server (preferably based on-shore), and 2.) Special purpose devices that are installed as clients on the participating marine vessels. A third necessary part of the system platform is the digital wireless communication means [digitally modulated VHF Radio frequency, a digital wireless two-way pager system, cellular SMS (short message system), satellite, or other suitable and/or cost effective digital wireless communication means]. The special purpose devices on the marine vessels, in their most basic form, integrate a GPS (Global Position System), a digital wireless transceiver/modem and an intelligent display with a keypad. The special purpose devices are also equipped with a standard interface for serial connection to another computer such as a laptop, chart displays and/or directly to the vessel autopilot.

At the heart of this platform is the fail-safe computer server, installed on-shore in the preferred embodiment of my invention, that has the function of continuously and automatically cycling 24/7 through the programmed instructions of the main application program and its subroutines. The computer server receives incoming data packets from the special purpose devices installed on marine vessels that are underway, anchored or docked within a designated shore/water region. These devices will be discussed a later paragraph that follows.

The incoming wireless data packets from the vessels contain values that represent the subject vessel identification, GPS coordinates, heading and speed, and an ensemble of other vessel status information that comprises options selected by vessel operators. The information is formatted and then processed 24/7 by a comparing algorithm contained within the main application program. This comparing algorithm automatically conducts a stepwise query of a large table of static and dynamic information resident in the server's relational database. Each appropriate database record is analyzed and compared with the data received for each specific vessel within the defined region. In the most basic application of my invention and is presented here as an example, the subject vessel coordinates, heading and speed contained in the packet of received data are compared with the dynamic data base records. Among these records are the data that have been stored for all current coordinate and heading information for participating vessels within the designated region. Should the comparison and control algorithm detect the potential of an impending collision of participating vessels, a warning and the nearby vessel IDs are automatically transmitted by the server to the participating vessels threatened in the potential collision. In essence, this example has demonstrated the equivalent application as my invention as radar for location of participating underway vessels.

To further extend this example of the basic application within the preferred embodiment of my invention, it is noted that a second server-based comparison and control software algorithm is also available. In this case, the algorithm will optionally conduct an analysis and comparison of the same current data (coordinates, heading and speed) received from the subject participating vessel with waypoints and ETA (expected time of arrival) in a vessel operator's pre-submitted float plan. This plan will be pre-stored as records within the Static part of the relational database. In the event that the result of this comparison determines that the vessel is considerably off-course and/or outside the time-window set in the float plan the server will automatically and proactively transmit an audible and visual warning to the operator. In both of these examples, programming may be conducted to cause the server to automatically transmit (send) an alert to emergency services including the US Coast Guard and participating vessels traveling along the float plan. As will be described later in this invention, the system platform is easily expanded or built-upon beyond the basic application in order to carry-out a large plurality of analyses for proactive warning, navigation and off-normal vessel status conditions.

In this most basic application of my invention it is required that the marine vessels operating within a given region have procured and have enabled the special purpose device. This device, in its most basic form, is of relatively low cost and integrates a digital wireless transceiver/modem, operating on the same frequency band as the server transceiver/modem, a GPS circuit and an intelligent display (alphanumeric or graphic supported by a microcontroller) with keypad. The intelligent part of the device will be programmed with a suite of microprograms that will conduct the two fundamental functions of: 1.) Controlling the transmission of vessel ID, navigational and status information and, 2.) Controlling the reception of server-transmitted server information and the display or provide an audible/visual alarm of warnings and the display of vessel operator queried information. The device will also have a port(s) for standard interfacing with other intelligent computer hardware such as a laptop computer, chart display, autopilot, etc.

It is noted here that design engineering of the enclosure for the special purpose device of my invention is a very important consideration. The device will likely integrate a radio transceiver in some applications in its physical enclosure. This is particularly true for short-range applications such as in some inland waterways and rivers that are about 5 to 10 miles in width. The addition of a waterproof enclosure and a 'snap-on' strobe light capability are important considerations. (As technology advances and future embedded communications hardware provides capability for longer distances of coverage over water, water proofing of the device and an add-on strobe will also become even more of a consideration.) The special purpose device may be used as a 'regional' Emergency Position Indicating Radio Beacon (EPIRB) should the participating vessel sink or some disaster force the vessel occupants into the water. Because of the simplification in communications, it is expected that the regional EPIRB will be available at a considerable reduction in unit purchase cost and provide faster response. The fail-safe 24/7 server of my invention will have the capability to instantaneously process a distress signal from the EPIRB and automatically transmit an alarm signal to the appropriate regional emergency services, including the regional US Coast Guard.

An important feature of my invention is the capability of the system to cycle independently and automatically at high reliability for 24 hours a day and 7 days a week. That is, unless the data received from the special purpose device on a vessel is of a critical nature, such as the indication of a severe emergency where the server is programmed to call for human intervention. Otherwise, human intervention is not required. The special purpose device will either routinely and automatically send its ID, position, heading and speed within a given time slot during a time window, when polled from the fail-safe server computer. The transmitted packet configuration will be in accordance with the International Maritime Organization specification for Self Organising Time Division Multiple Access (SOTDMA) or by means of an alternate communication procedure.

Second important features of my invention are modular design of the system and the use, in the preferred embodiment of my invention, of relational data base technology with an ORACLE database. The relational database is designed for ease of interfacing with a similar regional module(s) in adjacent or nearby regions. This feature facilitates coupling of system platforms in order to cover continuous or large regions and to implement technological advances identically across the enterprise platform. A consideration in this design of the invention is upward migration and scalability of the modules in the event that Central nodes for monitoring and control are required as part of the enterprise for applications such as Homeland Security. In this relational database scenario, as marine vessels travel from one region of coverage into an adjacent region of coverage, the current records for the vessel will automatically be handed-off onto the adjacent server's relational database. This will be accomplished by transactions over land-line and/or digital wireless communications. Vessel records may also be communicated upwards in the enterprise. This same principle may also apply to transfers to covered regions that are not adjacent. Normally, the fail-safe server for the home region of the vessel will permanently retain the static records for the vessel until the owner requests deletion thereof.

In the more advanced applications of my invention, as will also be described later in this patent, there will be a plurality of additional warning and informational computer subroutines that incorporate image analysis and artificial intelligence algorithms that also reside on the fail-safe server. These advanced subroutines and algorithms will proactively warn-for and provide tracking of severe weather, high winds, fog, rough seas, shallow water and a variety of other conditions. Subroutines having lesser priority will execute as background programs and conduct other functions. These lesser priority subroutines include archival of received data for vessel tracking, traceability for purposes of accident investigations and law enforcement, real-time responses to queries received for information from participating vessels in the region, monitoring of on-vessel conditions for off-normal status, and numerous others.

In an even more advanced application of my invention, software algorithms, resident on the fail-safe server, may also be selected by the vessel operator to request that the fail-safe server determine and transmit navigational waypoints and/or magnetic compass headings. These data may be for reason of advising the operator of a safe course for the participating vessel from its current position to safe harbor from a threat. A second reason may be that a course is requested by the operator to take the participating vessel from its current position to an operator-designated future position or location. The server-transmitted waypoints and/or magnetic compass headings may optionally be operator-interfaced to on-board equipment such as a vessel autopilot (in order provide setpoints for automatic control of the vessel navigation system), a display on the special purpose device and/or a display on an on-board sophisticated charting system. The server-transmitted course waypoints will comprehend redirection as necessary for any current unsafe conditions that exist in the region of the course such as underwater obstructions, storm conditions (high winds, waves, fog), nearby participating vessels, etc. This latter capability of my invention is particularly useful in the event the vessel operator suddenly becomes incapacitated or disoriented.

DESCRIPTION OF THE DRAWINGS AND TABLES

FIG. 3 is a table of values that indicate typically the keypad 24 entries (code vs. condition) and sensor inputs (not shown) available for the vessel operator in the emergency situations.

FIG. 4 is a table that indicates the typical keypad entries (code vs. condition) available to the operator for routine or non-emergency transmissions to the server.

FIG. 7 is an example table of the names of typical elements that are stored as static records in the fail-safe server database.

FIG. 8 is an example table of the names of typical elements that are stored as dynamic records in the fail-safe server database.

FIG. 10 is a table indicating the threats an advanced version of the system will proactively warn, alarm and control for.

HARDWARE

Figure 1:
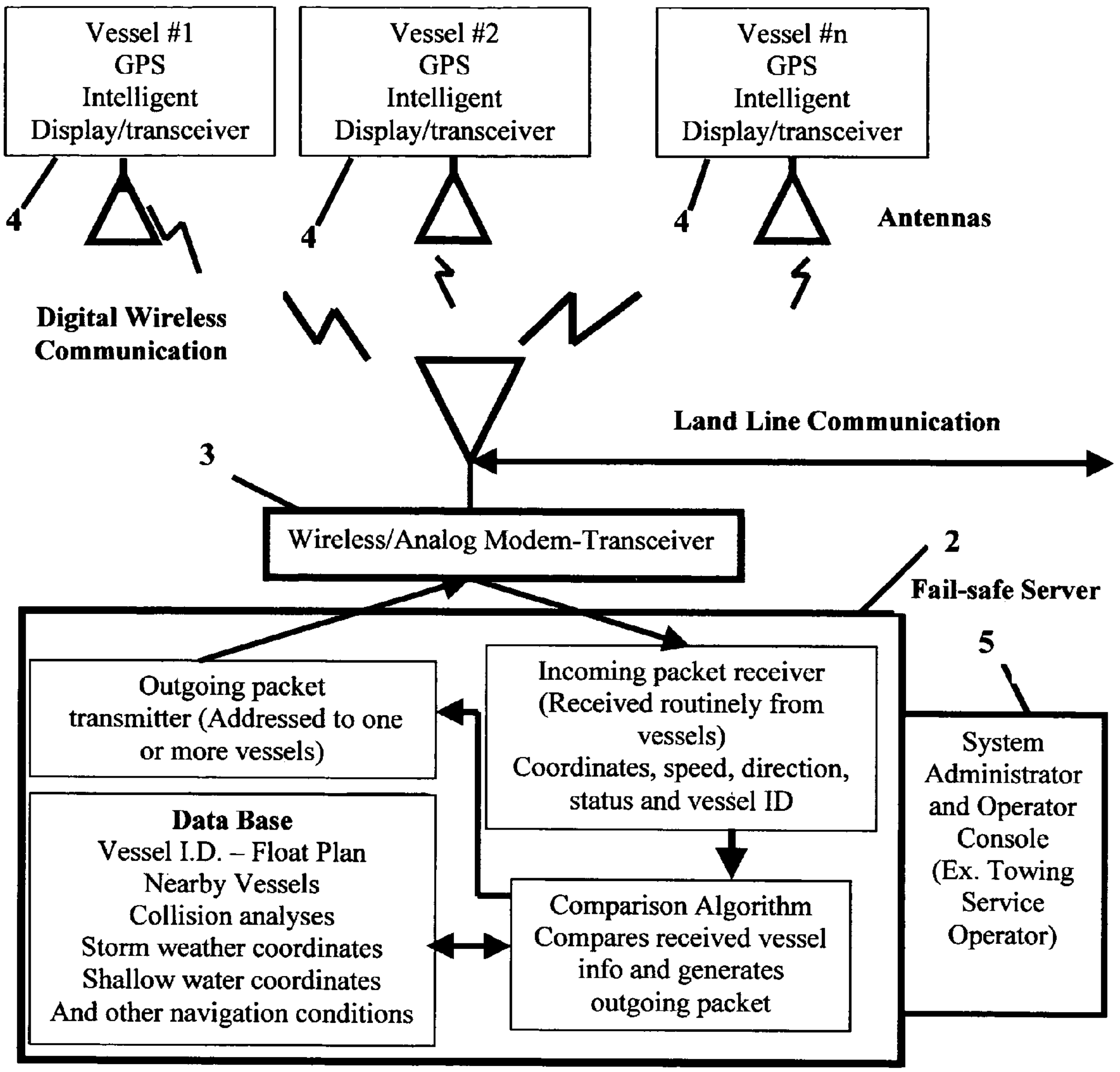
FIG. 1 is a block diagram schematic of the components in the basic system module for automatically tracking, monitoring, navigation and warning for one or a plurality of marine vessels.

Referring now to FIG. 1, reference numeral 2 refers to a fail-safe server that is normally positioned at a stationary location along a shoreline. In the preferred embodiment of this invention, the fail-safe server 2 will be located at the offices of a marine vessel privately-owned towing and salvage service for a particular region. The fail-safe server 2 includes adequate program memory (not shown) for shadowing all operations, a central processing unit, a random access memory, hot swappable disc memory and power supplies, and other features in order to insure maximum reliability with fail-safe 24 hour/7 day operation. A wireless/analog modem-transceiver 3 is interfaced with the fail-safe server 2 in order to provide communications with the special purpose devices 4 on marine vessels by means of digital wireless signals. Parallel and back-up analog communication will also be conducted via landline from docks or other land-based locations (not shown) or from interfaces to wireless cell phones (not shown). Associated with and interfaced to is a System Administrator-Operator control console 5. This control console 5 comprises a plurality of sophisticated peripheral gear (not shown). In the preferred embodiment of my invention, this will include a large graphical display for viewing the total region and parameters associated with it. Specific parameters and images will include weather Doppler/fog maps, icons for watercraft, navigation markers, emergency equipment and vessels and other images. The console 5 will also provide integrated access to marine radio, printers, scanners and other similar equipment.

The digital wireless and landline system that is implemented as an information exchange medium is dependent on the geographic location of the region to be monitored. Factors such as cost effectiveness, availability, coverage, terrain and power will influence the exact communications system selected. There are a few forms of communications technology that are appropriate as carriers. Specifically, digital wireless pager, digitally modulated VHF marine radio frequencies, digital wireless cell phone, and satellite are available as some of the more promising technologies that may be used to implement my invention. The digital wireless and landline system of communications will also be used as the interface between similar system modules in adjacent or nearby regions.

Figure 2:
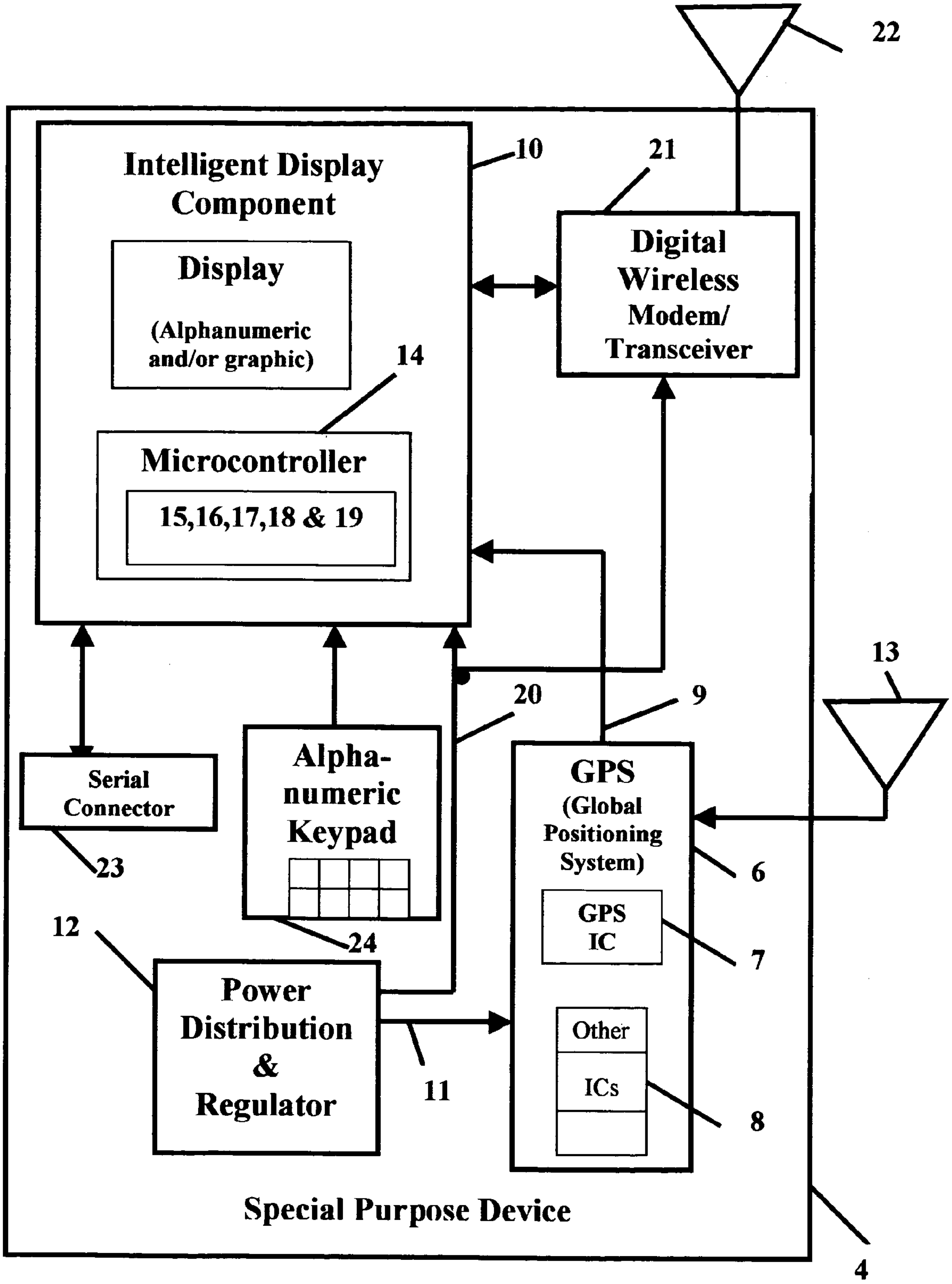
FIG. 2 is a block diagram of the components contained in the basic special purpose device that is located on a marine vessel that is either underway, anchored or docked.

Looking to FIG. 2, a block diagram is shown of the basic internal components of the special purpose device 4 that will be installed on-board marine vessels participating in within a given region. The global positioning system (GPS) component 6 of the special device comprises a single modular integrated circuit (IC) 7 similar to the GPS2020 IC manufactured by SyChip or the CXD2931-91GA9 by Sony Corp. The circuit 7 is supported by a complement of IC devices 8 and connections including a serial connection 9 to the intelligent display component 10, a power connection 11 from the power distribution and regulator 12, and to an appropriate GPS antenna 13. The GPS antenna 13 will either be mounted in close proximity (integral with special purpose device 4 or remotely via a coaxial cable connection to the GPS component. The intelligent display component 10 comprises a microcontroller 14 similar to a National Semiconductor, Inc. CR16HCS5 or other having an integral processor 15 supported by on-board electrically erasable program memory (EEPROM) 16, read only memory (ROM) 17, flash electrical erasable program memory 18, and random access memory 19. Additionally, the microcontroller 14 will provide digital and analog input/output (not shown) that is suitable for both monitoring and serial and parallel data applications. Other ICs (not shown) on the intelligent display component 10 support the microcontroller 14 clock, power shutdown (watchdog and heartbeat), and interfaces for serial and parallel devices and other purposes. The vessel owner will determine the type of display implemented and this is dependent on the degree of functionality that will be installed and programmed within the special purpose device 4. The power distribution and regulator 12 for the special purpose device 4 is contained on a printed circuit board. The power supply 12 provides regulation and circuit protection for the GPS component 6 through power connection 11, the intelligent display component 10 through the power connection 20 and the digital wireless transceiver/modem component 21 through power connection 20 as well. The digital wireless transceiver/modem component 21 comprises a modem integrated circuit ensemble (not shown) that includes all the necessary support. In the basic application of my patent there are a number of connections to the wireless transceiver/modem component and these include; either connections to the RF wireless antenna, VHF marine radio transceiver or other connection to a digital wireless antenna 22 (mounted either integral or remotely from the special purpose device 4, to the intelligent display component 11, and to the power supply connection 22. In the event that the marine vessel owner specifies additional functionality, beyond the basic system application described here, standard RF wireless intelligent transceiver/modem printed circuit boards (PCBs) such as the Motorola 'createalink' modem are also available that have considerable digital input/output capability. Such a PCB would be used for monitoring such vessel conditions as engine smoke alarm, forced entry, high bilge water level, excessive throttle position and others.

The serial connector 23 provides the serial interface for on-vessel peripheral equipment such as the autopilot system, a charting device, a handheld, laptop or personal computer, etc. The alphanumeric keypad 24 is used for Emergency transmissions to the server including Mayday, Man Overboard (MOB), injury and nature-of, etc. The table in FIG. 3 indicates the typical keypad 24 entries (code vs. condition) available for the vessel operator in the emergency situations. Note that some entries may be transmitted automatically by status sensors (not shown) mounted on the vessel. The table in FIG. 4 indicates typical keypad 24 entries (code vs. condition) available to the operator for routine transmissions to the server including NAVAID, maintenance/tow and other marine inquiries of the fail-safe server relational database 34. Particular attention is invited to Code 5 in the NAVAID section of the table in FIG. 4. This code entry will request a safe waypoint course between the current vessel position and a future position as defined by the vessel operator. The provided waypoints and/or magnetic compass headings may be used as input to an on-board autopilot system.

Placement of Hardware for the Basic Application

Figure 5:
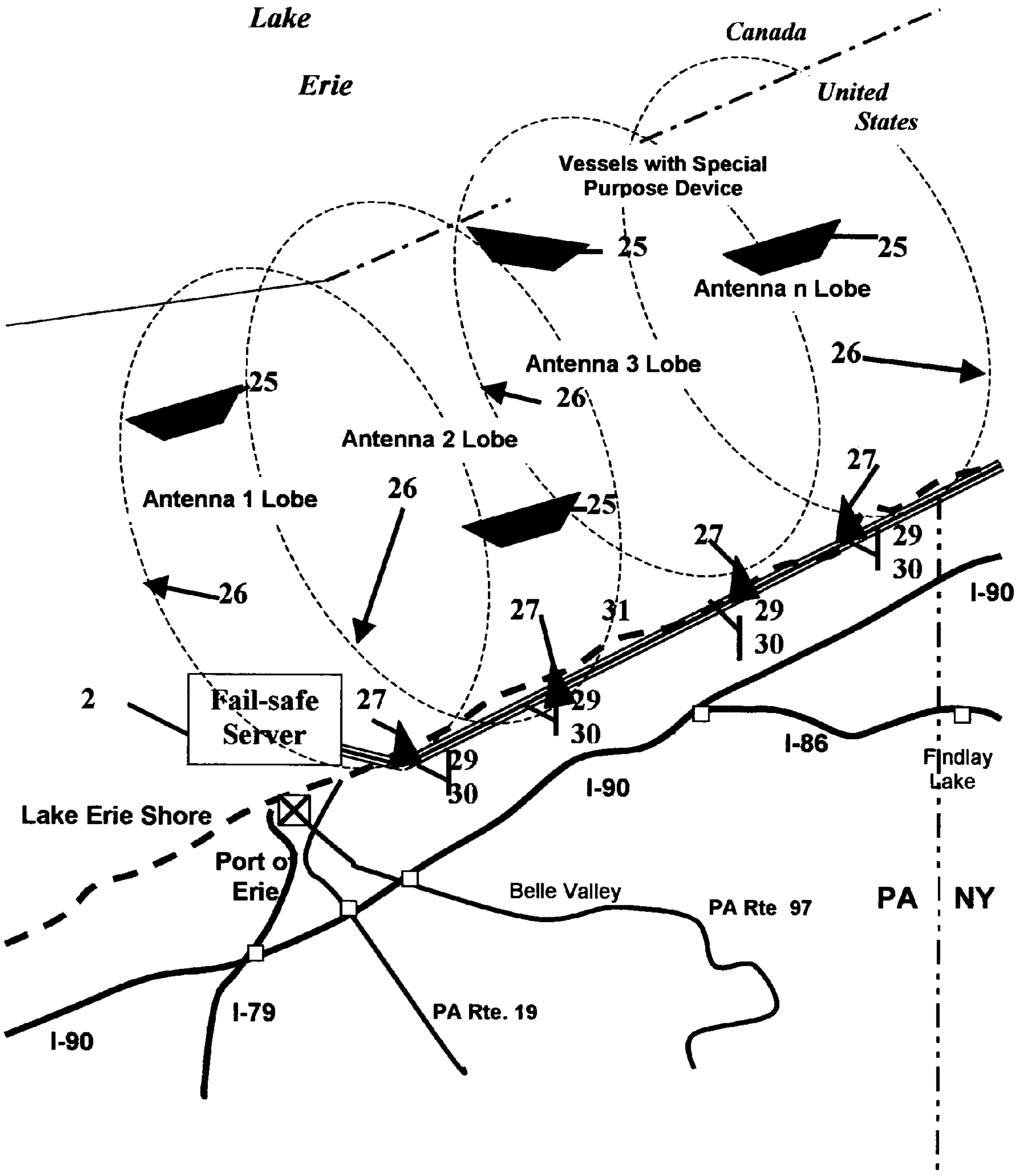
FIG. 5 is a geographical view of the implementation of the invention in a typical coastal/lake region

Looking at FIG. 5, four marine vessels 25 of various types are positioned on Lake Erie and are assumed to be underway. Each of the four participating vessels is equipped with an on-board special purpose device 4. As shown, the marine vessels are in the range of the overlapping antenna energy lobes 26 of four antennas 27 positioned along the South Shore of Lake Erie. Each of the antennas is providing the digital wireless network for the marine vessels 25, within an antenna's range, in order to transmit and receive data between the special purpose device 4 positioned on the marine vessels 25 and the land-based computer server 2. In this representative embodiment, four antennas 27 are interfaced with four digital Access Points 29 that are equally spaced along the shoreline. The Access Points 29 are in-turn interfaced via wireless re-transmitters/receivers 30 and a land-line (leased fiber optic cable, as an example) 31 for redundancy, in order to communicate the transmitted and received digital information to/from the land-based computer server 2. This collection of system apparatuses, herein, is also be referred to as an overall system "module" since many of these modules would be typically positioned along the Nation's coastal waters, Ports, shorelines of bodies of water and inland waterways and rivers. Each system is designed as an entity to be manned 24/7 by a system administrator/operator such as that found at a typical towing service. These system modules are also designed with an interface to optionally form a continuous land-based monitoring system for major geographical areas.

Software Resident in the Fail-Safe Server 2

Figure 6:
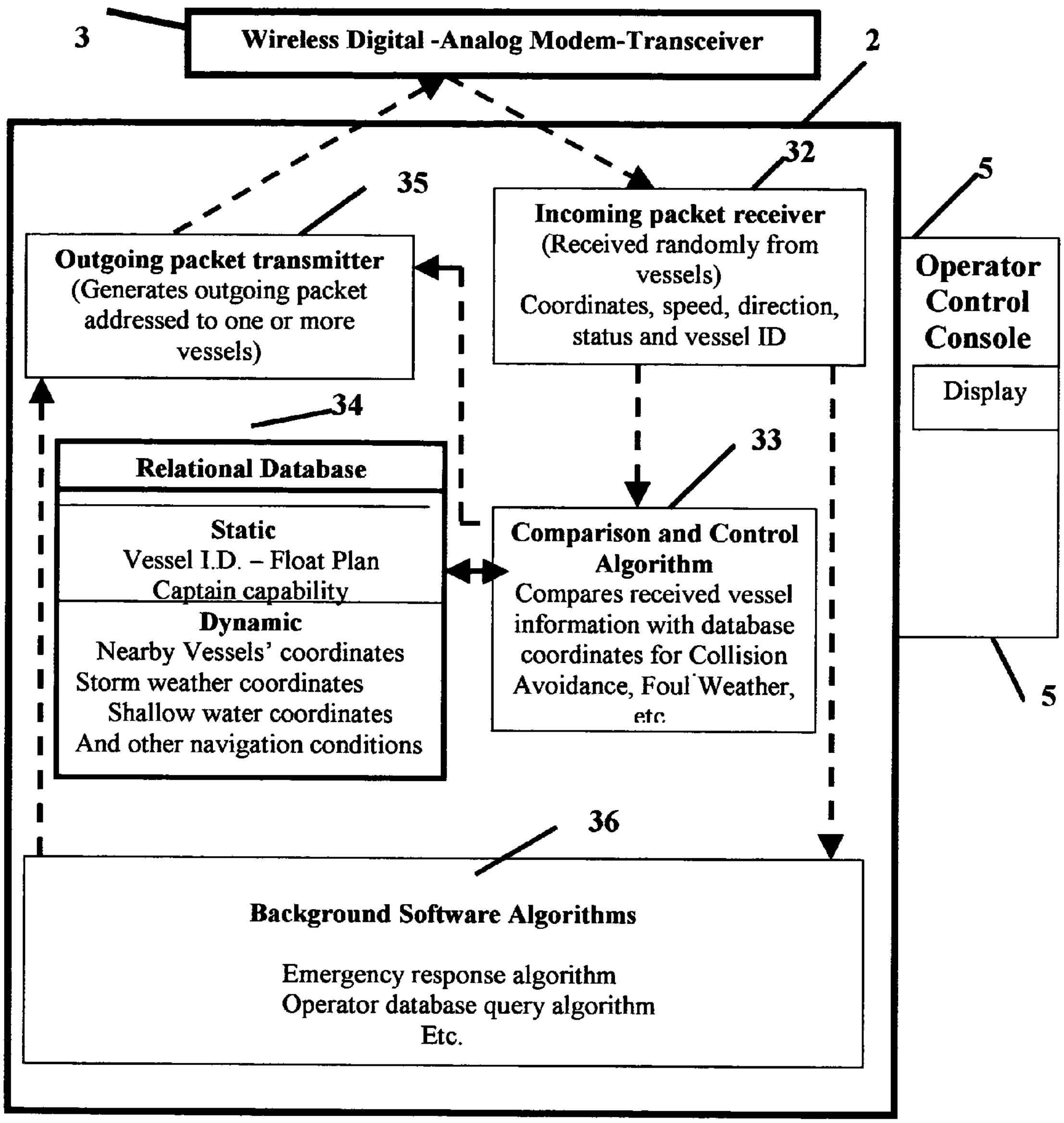
FIG. 6 is an abbreviated flow chart of the algorithm and data flow of the main comparison and control program resident in the fail-safe server.

In the basic embodiment of my invention, the fail-safe server 2 includes foreground application software programs that are generally shown here in FIG. 6. The data transmitted to the server from a specific marine vessel is received by the server's transceiver/modem 3 and converted to a digital packet that is transferred to the incoming packet receiver software algorithm 32 to be further processed. This packet receiver software algorithm 32 takes the bits contained in the incoming packet and converts them into an information format that will be displayed on the operator's control console 5 and also transferred to an artificial intelligence comparison and control algorithm having many embedded subprocesses 33. The information packet will, in the preferred embodiment of my invention, contain the vessel identification, position coordinates, speed, heading, vessel status and, potentially, operator query requests. The comparison and control algorithm 33 automatically compares the incoming packet information with both static and dynamic records stored in the software relational database (preferably Oracle) 34. Within the programmed steps in the comparison and control algorithm 33, a determination is made of the type of service that is associated with the incoming information (emergency, conventional tracking, operator query, or none). The result from the comparison and control algorithm is the information that will be coded into bits in the transmitted packet. These bits to be transmitted enable control action such as; displaying preprogrammed message(s)/images on the display of the special purpose device 4, turn-on or turn-off warning lights and/or audible signals, display coordinates, speed and direction of a nearby vessel, a storm front, and/or fog, and a multitude of other functions. The outgoing packet transmitter algorithm 35 follows the comparison and control algorithm 33. The packet transmitter algorithm 35 contains the steps necessary to configure a control packet for transmission to the appropriate participating marine vessel special purpose devices 4. Output of this algorithm is sent to the wireless digital-analog modem 3 for transmission. The degree of functionality is dependent on the selections specified by the vessel(s) owner/operator. The data transmission packet is packaged with the digital wireless identification for the specific and/or other vessels (dependent on the type of information being transmitted).

An ensemble of background software algorithms 36 is also resident on the fail-safe server. These algorithms may execute at either a higher or lower priority level than the foreground program. For example, if a vessel Mayday is received by the server as the result of a participating vessel operator enabling the proper key on the special purpose device 4 keypad 24, the proper algorithm is executed at the highest priority level (alerting nearby vessels and the US Coast Guard and other emergency services). As another example, the operator keypad 24 is enabled for a 'weather query' of the database 34, the algorithm to process this query will execute at a much lower priority and then will provide a concise regional weather evaluation. Yet another example is the operator enabling the keypad 24 code for "suspicious watercraft" (EE). This will indicate to the server to alert the US Coast Guard to determine if a 'Homeland Security Response' situation is warranted.

Principle of Operation

The degree of functionality of the total system of my invention is dependent on the capacity and capability of the combination of the fail-safe server relational database 34 and the artificial intelligence comparison and control algorithm 33. Each record in the database 34 contains information that forms the basis of a decision conducted by the comparison and control algorithm 33. Two types of records are stored in the database 34, and each record contains several elements. The static records are relatively non-changing over a period as long as owners have their vessels or as brief as the change from one defined trip of the vessel to the next. On the other hand, dynamic records can change near instantaneously as a result of received transmission, weather changes, presence of fog, routine position, speed and heading changes of a participating vessel.

The information in a static record is, for example, comprises of elements that are contained in a conventional float plan as recommended by United States Coast Guard—Boating Safety. The table in FIG. 7 indicates the name of the type of information that is normally is included in the static record for a specific vessel. Note that the information indicated in the example is an incomplete record, that is, in a working application there are considerably more items in the vessel database 34 static record. Specifically, the static elements in the database 34 might also contain capabilities of the vessel captain such as Emergency Medical Technician (EMT), Firefighter, CPR qualified, Diver, etc. These qualifications will be of considerable value in the event that the qualified Captain's participating vessel is near the distressed participating vessel. In any emergency, the server may alert both that Captain and the Emergency Services to these qualifications by means of a privileged access to display the qualifications on the Emergency Services' special purpose devices. The Emergency Services may then, for example, provide the Captain with voice-contact advisories as to what corrective treatment may be necessary.

In contrast, FIG. 8 indicates the type of information that is normally comprises a dynamic record. For the example shown, the records again are incomplete for purposes of the example; however, sufficient information is available to indicate the participating vessels' identification, position, heading and speed. These parts of the vessels' dynamic records are changing rather rapidly as a result of routine transmissions from the vessel at time intervals as short as tenths of seconds. Rapid samples are necessary in the event that there may be a case(s) where a collision threat is posed to one of the participating vessel. As noted further in FIG. 8, additional data included as records in the dynamic section of the relational database 34 are-time changing values of other conditions that may pose a threat to the participating vessels. Included are the width, heading and speed of storms, fog and waterspouts all located and position defined by image analysis and other software routines in the fail-safe server 2.

Figure 9:
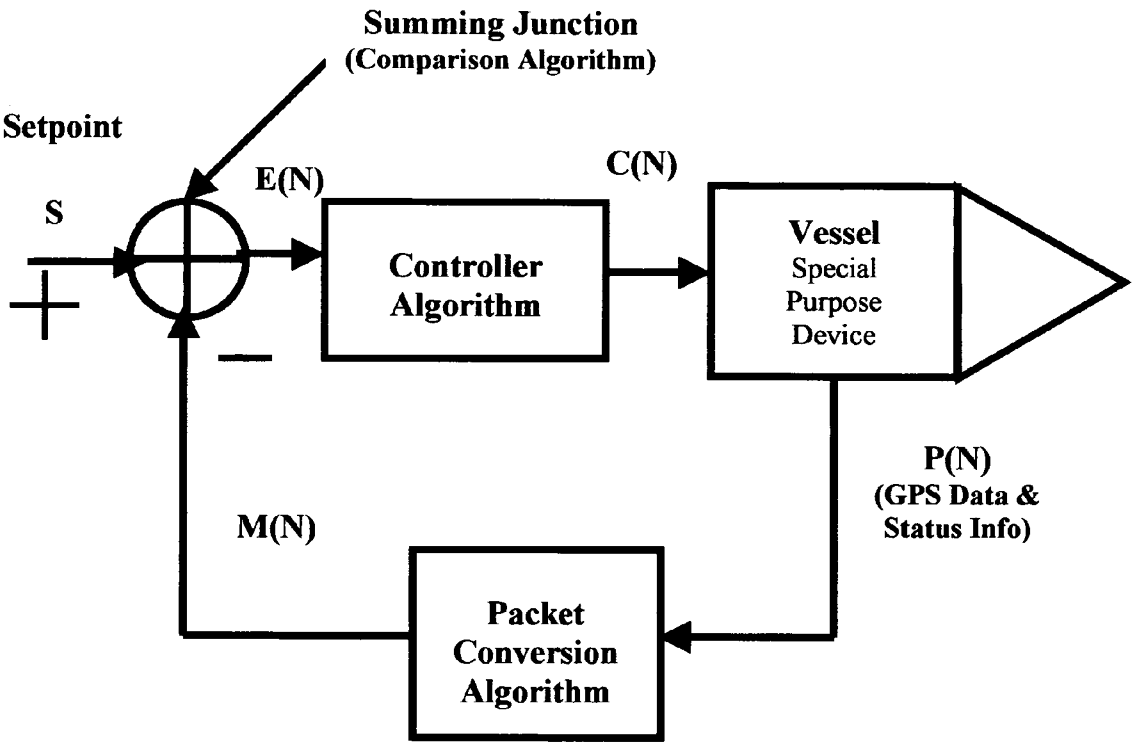
FIG. 9 is a block diagram showing the classic feedback control algorithm.

A particularly novel feature of the system of my invention is the use of the classic feedback control algorithm for intelligently scanning and comparing navigation-related information, on a continuous basis, and conducting consequent proactive warning and control functions. A block diagram of this algorithm is shown in FIG. 9. Looking now to FIG. 9, the algorithm continuously cycles and each time it cycles it receives the incoming GPS packet information P(N) from the on-board special purpose devices in the participating vessels. Where N=the identification for the subject vessel information being processed. To begin the cycle, the received packet P(N) is converted, by the Packet Conversion Algorithm, to a form suitable for comparison with setpoint values S. The setpoint values are sequentially loaded into the comparison algorithm from information stored in either the static or dynamic section of the database 34 resident in the fail-safe server 2. (The origin of the data stored in the database 34 will be discussed in a subsequent paragraph later in the invention.) Again looking at FIG. 9, the comparison algorithm that conducts the comparison between the values of M(N) and S contains sufficient intelligence to determine whether the subject vessel's position, heading and speed, or other status information contained in the incoming packet, poses a threat to the vessel. In such case, the value E(N) is generated that contains a value correspondent to the type of proactive warning, alarm and/or control that is to be transmitted to the subject participating vessel and/or emergency services. In this case, the E(N) value is converted to a packet form C(N), by the Controller Algorithm, and then transmitted as a proactive warning, alarm or control via the digital wireless modem associated with the fail-safe server 2. Based on the address(es) of the transmitted packet, it is targeted for specific special purpose devices on participating vessels and/or emergency services.

As a specific example, given the dynamic information for all participating vessels M(N) stored in the relational database 34, as described in the prior paragraph of my invention, in combination with incoming transmission from a subject participating vessel, for example M(1), when compared by the Comparison Algorithm with M(N) as setpoints, potential vessel collisions are automatically detected and proactively warned-for and thereby avoided. In this basic application of the my invention, the need for collision detection radar is potentially replaced as a result of a high level of participation of vessels in the system having on-board special purpose devices 4.

This same novel feedback control principle is applied in the system and apparatus of my invention for checking in incoming value M(N) against the setpoints S for severe weather information. The system, in its advanced application form will contain the software necessary for analysis of time-lapse NOAA Doppler radar images available from sources including the Internet. The 'yellow-red areas' in a Doppler image represent severe moving storm areas. Image analysis technology will be used to determine a tangential width of the storms, direction and speed over waters. Accordingly, this converted weather information will be routinely stored in a setpoint S table in the dynamic section of the fail safe server's 2 relational database 34 as a storm path. By using the 'end-point' coordinate information of defined severe weather fronts, combined with speed and direction stored as dynamic records, the routine incoming participating vessel transmissions M(N) are compared, by the Comparison Algorithm, with current storm front coordinates, direction and speed of travel. A participating vessel(s) anywhere in the path of the oncoming storm will be proactively warned, via a message(s) and/or displayed images, that indicate the storm front location, heading, width and speed. The server will support this information with an advisory of action that vessels must take, such as changing course, speed and heading to an assigned waypoint, in order to avoid the storm front. This novel methodology of my patent extends the capability of vessel operators to act proactively in severe weather situations and thereby avoid one of the most frequent causes of boating accidents in the private sector.

In the first column in the table shown as FIG. 10 are listed the type of Function or Threats that an expanded version of the system of my invention is capable of either conducting or correcting-for by providing proactive warnings alarms and control, respectively. The second column indicates the correspondent information contained in dynamic part of the database 34 that will be analyzed by the intelligent software routines that are resident on the fail-safe server 2 for determination of the setpoints S in the control algorithm. The third column lists a description of the value that is correspondingly determined for S that will be compared with the incoming value of M(N).

Software Resident in the Special Purpose Device 4

Figure 11:
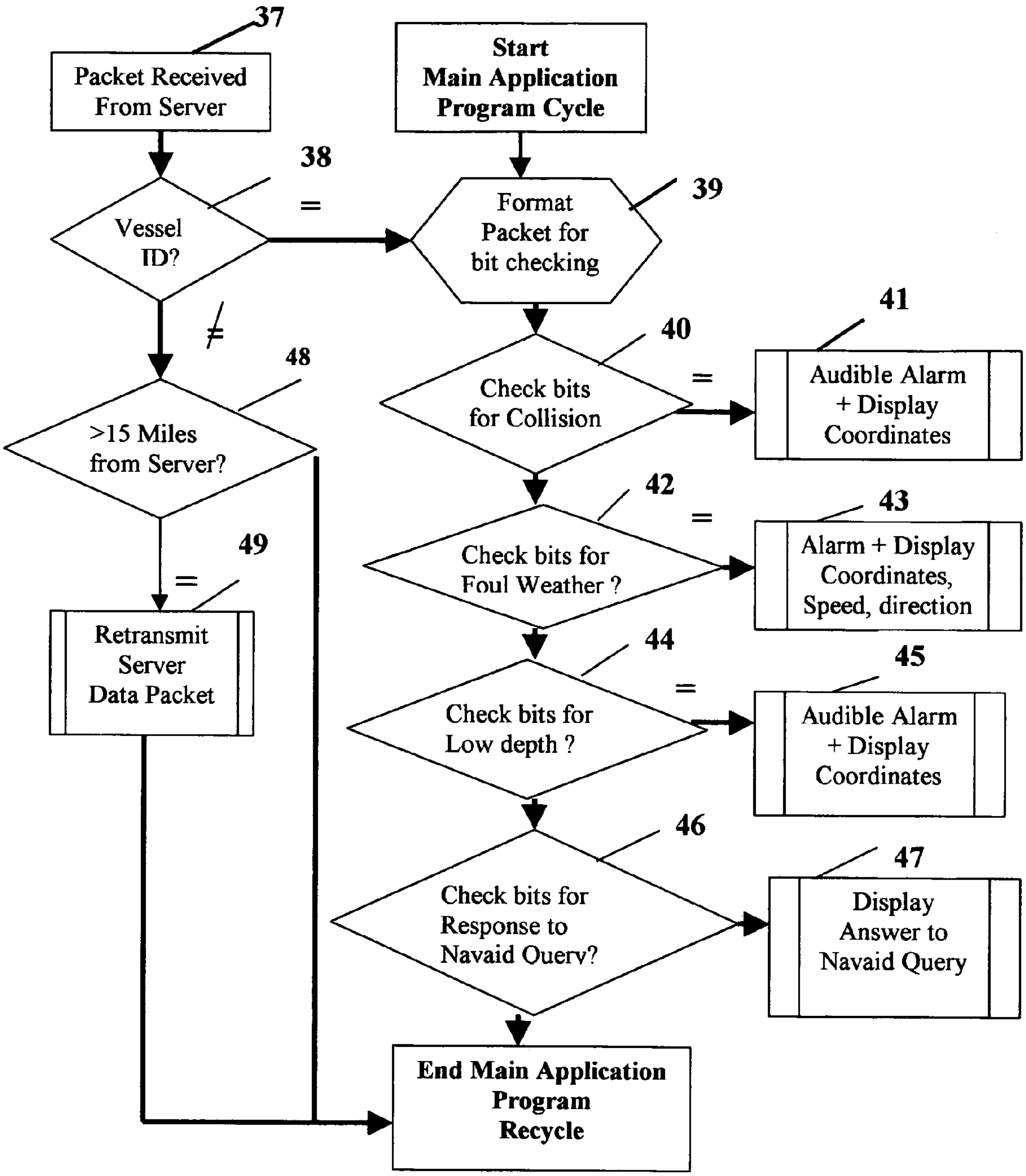
FIG. 11 is an abbreviated flow chart of the main algorithm and the subprogram excitation procedure contained in the special purpose device microcontroller.

The abbreviated flow chart of FIG. 11 is included in order to provide a simplified visual description of the interaction between the fail-safe server 2 and the special purpose device 4. In general, the application program within the special purpose device's 4 microcontroller 14 comprises a main algorithm composed of decision program routines and these enable subprograms. The type of subprograms enabled occurs as a function of the bit configuration within data packets received from the fail-server 2. Other application software in the special purpose device executes in the background and this software permits the vessel operator to conduct queries of the fail-safe server 2 relational database 34, send a coded emergency alert to the fail-safe server 2, and numerous other special purpose functions. The extent of special purpose functions that are available to the vessel operator/owner, beyond the basic application, is dependent on the participation (or subscriber) level of the system purchased.

Looking now at FIG. 11, the wireless data transceiver/modem component 21 in the special purpose device 4 sends the data packet received from the fail-safe server 2, via a serial data line to a software buffer 37. Prior to processing within the special purpose device software functions, the packet is checked at decision element 38 to determine if the packet ID is for the vessel. If the ID is not equal, then the current participating vessel distance from the server 2 is checked by decision element 48 to determine if the vessel is approaching the 20 mile range on transmission/reception of Marine Radio (assuming here that a Marine Radio frequency is the mode of communication). If decision element determines that it is approaching that range limit, packets for other IDs will be retransmitted. The strategy here is to extend the range to other vessels that may have reached somewhat beyond the 20-mile limitation. As shown in FIG. 11, if decision element 48 indicates that the vessel is closer than 15 miles to the server 2, retransmission of the packet is not conducted. The packet is then processed into a format for bit checking by the application software processor 39.

If decision element 38 determines that the ID agrees with the specific data, the data is then transferred the packet formatting software 39 in order to prepare it for bit checking within the packet. The packet is then sent to the first decision software routine 40 that determines if the server 2 has detected if a collision is imminent with either another vessel, a stationary element such as a bridge support, or other defined obstruction. If a collision is imminent, then subroutine 41 enables an audible proactive alarm and displays the coordinates of the nearby obstruction. If no bits are present in the formatted packet, the data is checked for bits indicating foul weather by the decision application routine 42. If the foul weather bits are detected, then subroutine 43 is enabled and an alarm is issued in combination with the coordinates, speed and direction of the oncoming inclement weather front. If no bits are detected by routine 42, then low water depth bits are checked-for by routine 44. Presence of low water bits will also enable subroutine 45 that provides both an audible alarm and displays the coordinates of the low water. Finally, routine 46 checks for bits that indicate that there is a response in the packet for a Navigation Aid (Navaid) query by the vessel operator. Presence of this bit will call-up a subroutine 47 that causes the displays the answer to the operator's query via an alphanumeric phrase. The Main Application Program ends then ends its cycle and either enters a time delay for the next cycle or is automatically re-enabled by the fail safe server 2.

The application program steps in the example of FIG. 11 may vary dependent on optional selections by the vessel owner. This example illustrates only one of many possibilities that may be implemented by the fundamental methodology of the instant invention.

I claim:

1. An automated navigation assistance system for predictive analysis of time lapse and static meteorological, oceanographic and other forms of environmental and physical information that relate to conditions that threaten safe navigation and from this analysis provide proactive warnings and an advisory float plan that consists of headings to a safe location for one or a plurality of marine vessels operating within a defined navigable region comprising:

a) A special purpose device for use on each marine vessel participating in the system; and said device may be implemented as portable, installed in a temporary mounting or configured as an integral part of another device and; except for a source of power is electrically independent of and separate in function from of all on-vessel operating systems and instrumentation and; is fitted with internal global position system (GPS) electronics used to provide vessel information (position, speed and heading) and; is further fitted with an operator keypad, indicator lights and an audible anunciator and; automatically transmits the GPS information and operator keyboard entries relating to on-board emergencies and National security, and server database inquiries by a dedicated digital wireless communication link to a remote and dedicated on-shore fail-safe server;

b) said server being adapted to routinely receive and store the vessel GPS information (position, speed and heading) as transmitted by a dedicated digital wireless communications link with the said device;

c) said server being still further adapted to receive and store occasional operator keypad-entry data as transmitted by said communications link with the said device;

d) said server being still further adapted to automatically acquire information from the Internet and other sources that define the future environmental state exterior to the immediate environment of said vessel or plurality of said vessels operating within said regions and; the general class of the information acquired from these sources include measured and modeled geophysical and other navigation-related information for the future environmental state of said vessels or plurality of said vessels and; the geophysical and other information include dynamic and static meteorological measurements as Doppler weather radar images, climate maps, weather buoy and weather station data, wind severity and sea turbulence mathematical models, oceanic and Inland waters information from digitized navigation charts including undersea topology and navigation aid locations, tide tables, current specification of hazards that are within the surrounding exterior environment of said vessels such as the location, heading and speed of nearby participating vessels and maritime ships, uncharted above and below water structural hazards other information relating to that normally causing said vessels an unanticipated serious accident while navigating within said region;

e) said server being still further adapted to apply comprehensive and intelligent image analysis, pattern recognition, artificial intelligence and an ensemble of similarly complex application software algorithms as needed to analyze said information in order to identify magnitude, size, location, speed and heading of said threats to said vessels and use the results of this analysis as a basis for proactively warning one or a plurality of said marine vessels of said threats to the vessel and its occupants; and said threats include severe storms, high winds and seas, approach of participating vessels and maritime ships, above- and under-water obstructions, restricted areas and other determined threats within the path or heading of or are approaching said vessel or a plurality of said vessels;

f) the server being still further adapted to use a classic feedback control algorithm to sequentially compare the stored said vessel GPS information, as the measured variable, individually with the position, speed and heading of dynamic said threatening conditions and position only of static said threatening conditions as the setpoint variable;

g) the server being still further adapted to automatically compile and generate the parameters for concise alphanumeric and graphics display of proactive warnings and for enabling warning lights and audible alarms on said device as a first component of the supervisory control function of the said feedback control algorithm; and include as a parameter a request for said vessel operator acknowledgement by a said device digital wireless transmission to the said server in the event the server comparative analysis concludes there is one or more near future threatening conditions to occur to the said vessel or to said plurality of vessels and occupants and; these said conditions will occur typically within a time span of a fraction of a minute to a few hours in the future;

h) said server being further adapted to automatically send these said parameters by means of said communications link with the said device located on said vessel or on a plurality of said vessels;

i) said server being still further adapted to automatically compute a proactive advisory as a second component of the supervisory control function of the said feedback control algorithm and; this said advisory is a float plan that comprises the optimum and safe float plan consisting of magnetic compass headings and/or waypoints to a safe location in order to remove or reduce the said threat to the said vessel or a plurality of said vessels;

j) said server being still further adapted to automatically prepare and transmit a packet of information that includes the proactive warning and safe heading advisory to a said vessel or plurality of said vessels;

k) said server being still further adapted to automatically prepare and transmit a packet of information that describes the nature of the threat to said vessel or plurality of said vessels and; automatically send this packet to either alert or summon the proper emergency-responder, Federal, State and local Government jurisdictions and nearby vessels;

l) said server being still further adapted to automatically compare the operator-entered keypad data for said on-vessel emergencies and National security with need to either alert or summon the proper vessel service assistance including towing service, emergency-responders, Federal, State and local Government jurisdictions and nearby vessels and; automatically send this packet to either alert or summon said responders and nearby vessels if determined as necessary;

m) said device on said vessel or plurality of said vessels being adapted to receive the parameters and provide a clear and concise said display of the navigation-threatening conditions and to alert said vessel operators of the presence of the said displayed conditions by enabling the warning lights and audible alarm;

n) said device being adapted to receive and alphanumerically display, as a proactive advisory, the float plan consisting of said headings and/or waypoints to remove or reduce the threat to the said vessel or a plurality of said vessels and occupants;

o) the navigation assistance system wherein the defined navigable regions of operation include coastal, Inland lakes, waterways and other navigable waters.

2. The navigation assistance system of claim 1, wherein the said device is further adapted to allow the operator to exercise the option of interfacing and downloading the said safe float plan consisting of magnetic compass course headings and/or waypoints to a vessel system that applies control of the vessel helm or rudder; and these are the proactive advisory float plan that consists of safe magnetic compass course headings and/or waypoints designated as the as a second component of the supervisory control function from the classic feedback control algorithm.

3. The navigation assistance system of claim 1, wherein the GPS information (position, speed and heading) available within the said device electronic circuitry is routinely collected and transmitted by means of digital wireless communications for analysis by the remote or shore-based fail-safe server.

4. The navigation assistance system of claim 1, wherein the said device further comprises an interactive operator interface means for mariner-initiated communication with the server.

5. The navigation assistance system of claim 1, further comprising external communication means for initiating automatic contact between the remote or shore-based fail-safe server with a second party.

6. The navigation assistance system of claim 1, wherein the special purpose device further includes one or a plurality of ports for optionally interfacing downloaded float plan consisting of said headings and/or waypoints to other on-vessel electronic devices and instrumentation such as navigation chart plotters and laptop computers.

7. A method of ensuring marine vessel and occupant safety comprising:

a) routine automatic monitoring of relevant data concerning participating marine vessels;

b) comparing said relevant data to a before-the-fact (apriori, predictive) analysis of time lapse and static meteorological, oceanographic and other forms of environmental and physical conditions to determine whether threats to the said vessels and their occupants exist, and c) automatically and proactively notifying a specific or a group of said marine vessels of said conditions that are a threat to vessel navigation and safety of the vessel and its occupants.

8. The method set forth in claim 7 wherein the relevant data comprises the GPS information (position, speed and heading).

9. The method set forth in claim 7 further comprising the transmittal of advisory safe course information that an threatened vessel operator may optionally elect to interface from the special purpose device port to automatically steer said vessel.

10. The method set forth in claim 7, further comprising capability to automatically respond to queries of the ORACLE database resident in the fail-safe server as initiated by said vessel operator.

11. The method set forth in claim 7, further comprising automatic response to the database queries initiated by said vessel operator.

12. The method set forth in claim 7, further comprising handing off data about a participating vessel from a first remote or shore-based fail-safe server to a second remote or shore-based automated navigation assistance and proactive warning system fail-safe server.

13. An automated navigation assistance system for one or a plurality of marine vessels comprising:

a) a dedicated special purpose device in each marine vessel for providing its internal GPS information (position, speed and heading) and operator keypad-entered data and transmit said data to a remote fail-safe server; said device being further adapted to provide the vessel operator with the option to apply received proactive advisory float plan consisting of magnetic compass headings and/or waypoints to automatically operate the vessel helm or rudder the vessel; and still further comprising one or a plurality of ports for optional data downloads of said magnetic course headings and/or waypoints to other electronic devices for display;

b) said fail-safe server being adapted to receive and store GPS information (position, speed and heading), operator keypad-entered data and still further adapted to cooperatively communicate with one or a plurality of separate navigation assistance systems;

c) said server being still further adapted to continuously apply GPS information (position, speed and heading), operator keypad-entered emergency data received from said device to generate a hard-copy report of contact at the said server location in the event any warning has been transmitted to a participating vessel;

d) said server being still further adapted to communicate with an nearby monitoring computer integral with the server system architecture; and said computer is interfaced with the server for purposes of manually accessing, updating, monitoring and displaying all relevant information in the ORACLE database by system administration and primary on-shore host location personnel;

e) said server being still further adapted to store a complete audit trail or history in the ORACLE database comprising of all information during and subsequent to threatening incidents and potential accidents and security breaches (as entered by means of the operator keypad) and other incidents in the ORACLE database for purposes of analysis by accident investigators, Homeland Security and other jurisdictions.

* * * * *